United States Patent
Negre et al.

(10) Patent No.: US 11,574,480 B2
(45) Date of Patent: Feb. 7, 2023

(54) COMPUTERIZED DEVICE FOR DRIVING ASSISTANCE

(71) Applicants: Inria Institut National De Recherche En Informatique Et En Automatique, Le Chesnay (FR); Commissariat A L'Energie Atomique Et Aux Energies Alternatives, Paris (FR)

(72) Inventors: Amaury Negre, Villard-Bonnot (FR); Christian Laugier, Montbonnot Saint Martin (FR); Lukas Rummelhard, Grenoble (FR)

(73) Assignees: Inria Institut National de Recherche en Informatique et en Automatique; Commissariat A L'Énergie Atomique Et Aux Énergies Alternatives

(*) Notice: Subject to any disclaimer, the term of this patent is extended or adjusted under 35 U.S.C. 154(b) by 549 days.

(21) Appl. No.: 16/620,123

(22) PCT Filed: Jun. 6, 2018

(86) PCT No.: PCT/FR2018/051299
§ 371 (c)(1),
(2) Date: Dec. 6, 2019

(87) PCT Pub. No.: WO2018/224768
PCT Pub. Date: Dec. 13, 2018

(65) Prior Publication Data
US 2020/0104606 A1  Apr. 2, 2020

(30) Foreign Application Priority Data
Jun. 9, 2017 (FR) ........................ 1755150

(51) Int. Cl.
*G06T 7/00* (2017.01)
*G06V 10/00* (2022.01)
(Continued)

(52) U.S. Cl.
CPC ........... *G06V 20/56* (2022.01); *G05D 1/0088* (2013.01); *G06K 9/6297* (2013.01); *G06V 20/13* (2022.01);
(Continued)

(58) Field of Classification Search
CPC .... G06T 7/05; G06T 7/11; G06T 7/90; G06V 20/52; G06V 20/58; G06V 10/26;
(Continued)

(56) References Cited

U.S. PATENT DOCUMENTS 8,215,252 B1 * 7/2012 Chun .................. B63B 39/08
  440/51
8,295,554 B2 * 10/2012 Francini ................. G06T 17/05
  382/109

(Continued)

FOREIGN PATENT DOCUMENTS

CN       104899854 A  *  9/2015

OTHER PUBLICATIONS

A generative model of terrain for autonomous navigation in vegetation; Wellington—2006. (Year: 2006).*

(Continued)

*Primary Examiner* — Luis Perez-Fuentes
(74) *Attorney, Agent, or Firm* — Maynard Cooper & Gale, P. C.; Brian T. Sattizahn

(57) ABSTRACT

A computerized device for driving assistance comprises a memory (4) designed to receive data point cloud data (8) in which a point cloud associates, for a given instant, points each having coordinates in a plane associated with the point cloud and a value denoting a height. The device furthermore comprises a calculator (6) designed to access the memory (4) and, for a given point cloud, to calculate data on the probability of belonging to a reference surface, associated with each point of the data point cloud, on the one hand, and (Continued)

Figure 1:
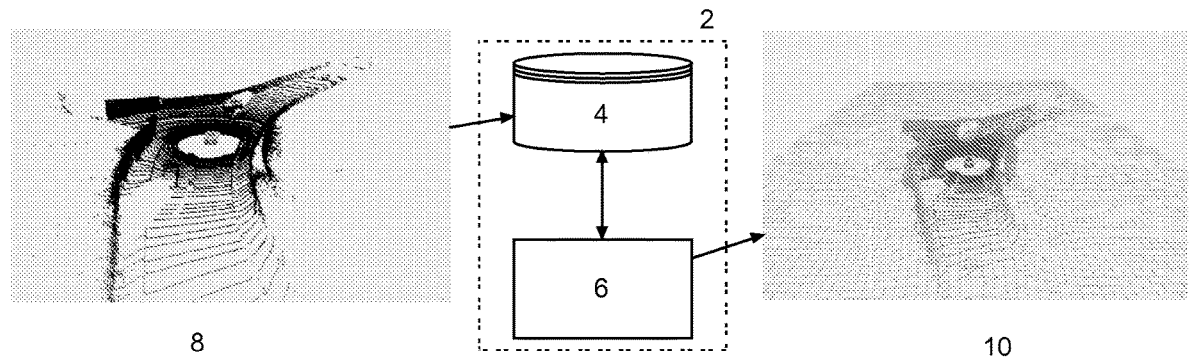

node data associating a value denoting a height (hi) and two values indicating a slope in a plane associated with the plane of the given point cloud, on the other hand, by determining a Gaussian random conditional field by way of the data point cloud data (8) corresponding to the given point cloud, which Gaussian random conditional field is represented by a mesh of nodes in said associated plane, which nodes are defined by the node data, and to return the data on the probability of belonging to a reference surface and/or at least some of the node data and values denoting a height.

13 Claims, 2 Drawing Sheets

(51) Int. Cl.
  *G06V 20/56* (2022.01)
  *G05D 1/00* (2006.01)
  *G06K 9/62* (2022.01)
  *G06V 20/13* (2022.01)

(52) U.S. Cl.
  CPC ........... *G05D 2201/0213* (2013.01); *G06T 2207/10028* (2013.01)

(58) Field of Classification Search
  CPC ............. G06V 10/457; G08B 21/0476; G08B 21/165; G06K 9/624; G06K 9/6267
  See application file for complete search history.

(56) References Cited

U.S. PATENT DOCUMENTS

| | | | | |
|---|---|---|---|---|
| 8,605,998 B2* | 12/2013 | Samples | ............... | G06V 20/58 382/104 |
| 9,188,783 B2* | 11/2015 | Papas | ............... | G02B 27/0927 |
| 10,007,850 B2* | 6/2018 | Leung | ............... | G06V 20/52 |
| 10,133,944 B2* | 11/2018 | Zink | ............... | G06N 3/049 |
| 10,229,341 B2* | 3/2019 | Zink | ............... | G06T 7/246 |
| 10,810,876 B2* | 10/2020 | Yamanaka | ............... | G06V 20/58 |

OTHER PUBLICATIONS

Autonomous terrain mapping and classification using Markov models; Wolf—2006. (Year: 2006).*
Autonomous driving in urban environments; Boss—2008. (Year: 2008).*
A hybrid CRF for estimating underline ground surface from airborne Lidar data; Lu—2009. (Year: 2009).*
Multi-Lane Detection in Urban Driving Environments; Hur—2013. (Year: 2013).*
Semantic Segmentation of Terrain and Road Terrain for Driver Assistance; Valentin—2015. (Year: 2015).*
Detecting drivable area for self-driving cars; Liu—May 2017. (Year: 2017).*
Gaussian process regression-based robust free space detection; Xiao—Aug. 2017. (Year: 2017).*
Ground estimation and point cloud segmentation using spatio-temp CRF; Lukas—2017. (Year: 2017).*
Yang Wang, et al., "A Dynamic Conditional Random Field Model for Object Segmentation in Image Sequences," IEEE Computer Society Conference on Computer Vision and Pattern Recognition, 2005, pp. 264-270, vol. 1.
Lei Zhang, et al., "Segmentation of Video Sequences Using Spatial-Temporal Conditional Random Fields," IEEE Workshop on Motion and Video Computing, 2008, pp. 1-7.
Wei-Lwun Leu, et al., "A Hybrid Conditional Random Field for Estimating the Underlying Ground Surface from Airborne LiDar Data," IEEE Transactions on Geoscience and Remote Sensing, 2009, pp. 2913-2922.
Chunzhao Guo, et al., "Graph-Based 2D Road Representation of 3D Point Clouds for Intelligent Vehicles," IEEE Intelligent Vehicles Sympoism, 2011, pp. 715-721.
Zhang Mingfang, et al., "Ground Segmentation Based on Loopy Belief Propagation for Sparse 2D Point Clouds," IEEE International Conference on 3D Vision, 2015, pp. 615-622.
Rummelhard Lukas, et al., "Ground Estimation and Point Cloud Segmentation Using SpatioTemporal Conditional Random Field," IEEE Intelligent Vehicles Sympoism, 2017, pp. 1105-1110.
Sunando Sengupta, "Semantic Mapping of Road Scenes," http://www.robots.ox.ac.uk/tvg/publications/2014/thesis_sundando_small_2014.pdf, 2014, pp. 1-69.
Sunando Sengupta, "Semantic Mapping of Road Scenes," http://www.robots.ox.ac.uk/tvg/publications/2014/thesis_sundando_small_2014.pdf, 2014, pp. 70-138.

* cited by examiner

COMPUTERIZED DEVICE FOR DRIVING ASSISTANCE

The invention relates to the field of driving assistance. The field of driving assistance comprises assistance to fully autonomous vehicles and assistance to vehicles controlled with aids, with or without a driver. This field can also relate to other situations linked with driving, such as management of the environment, be it on a road or in an industrial environment.

There are two principal families of technologies for autonomous vehicles: perceptive autonomous vehicles, that is to say those capable of getting their bearings in any environment, and aided autonomous vehicles, that is to say those which do not have any actual local perception of the environment. These two families are technically very distinct, and call upon completely different technologies.

Beyond the distinct techniques, these families of vehicles can be used in very different contexts. For example, a perceptive autonomous vehicle is unavoidable when there is little or no mapping of the environment of use, and/or when geolocalization in this environment is complex. This is the case for example in numerous applications such as in the field of agriculture or of industrial robotics. The notion of autonomous vehicle will therefore be taken in a broad sense, that can cover cars as well as tractors or other agricultural machine or a robot capable of moving.

The invention is more particularly concerned with the field of perceptive autonomous vehicles. Conventionally, this type of vehicle uses means for analyzing its environment in order to define obstacles. Historically, these obstacles were detected by planar laser telemetry.

These technologies have evolved, and now integrate the 3D LIDAR or else stereo cameras as telemetry source. This makes it possible to increase the number of data points, and therefore the perception of the environment. However, this poses the problem that, among the data points detected, many correspond to the ground, whilst in the previous techniques, any datum point automatically designated an obstacle.

Techniques have therefore been developed in order to determine in a point cloud obtained by LIDAR or another technique including the ground in the data points, those portions which correspond to the ground and those portions which correspond to obstacles. The known techniques are either accurate but not real-time (for example the current implementations using Markov conditional fields or MRF), or are compatible with real-time use but are insufficiently accurate (for example, by fitting of a plane on the ground).

The invention aims to improve the situation. To this effect, the invention proposes a computerized device for driving assistance, comprising a memory designed to receive data point cloud data in which a point cloud associates, for a given instant, points each exhibiting coordinates in a plane associated with the point cloud and a value designating a height.

The device furthermore comprises a calculator designed to access the memory and, for a given point cloud, to calculate on the one hand data on the probability of belonging to a reference surface and which are associated with each point of the data point cloud, and on the other hand node data associating a value designating a height and two values indicating a slope in a plane associated with the plane of the given point cloud, by determining a Gaussian conditional random field by means of the data point cloud data corresponding to the given point cloud, which Gaussian conditional random field is represented by a mesh of nodes in said associated plane, which nodes are defined by the node data, and to return the data on the probability of belonging to a reference surface and/or some at least of the node data and values designating a height.

This device is particularly beneficial since it enables a distinction to be made between ground and obstacles, as well as enabling a respective height of the data points to be ascertained, with a calculational cost that is compatible with real-time use in an autonomous vehicle.

In other embodiments, the device will be able to exhibit one or more of the following additional characteristics:

the calculator is designed to apply a Gaussian conditional random field comprising a first spatial component calculated, for a given node, on the basis of a value derived from the difference between the height of the given node and a height calculated on the basis of the coordinates of the given node, of the slope data of the given node and of the coordinates of the points closest to the given node, and a second spatial component calculated, for a given node, on the basis of a value derived from the difference between the node data of the given node and of node data calculated on the basis of the coordinates of the given node, of the node data of the nodes closest to the given node and of the coordinates of the nodes closest to the given node, the calculator is furthermore designed to apply a Gaussian conditional random field comprising a temporal component calculated, for a given node and a given instant, on the basis of the node data of the given node and of the node data of the given node at an instant preceding the given instant, the calculator is designed to apply an expectation-maximization algorithm to calculate the data on the probability of belonging to a reference surface and the node data, the calculator is designed, after an initialization step, to apply the expectation-maximization algorithm by alternating an expectation calculation step and a maximization calculation step—the calculator is designed to execute the expectation calculation step by updating the data on the probability of belonging to a reference surface of a given point of the given point cloud on the basis of a reference distance value derived from the difference between the value designating a height of the given point and of a height calculated on the basis of the coordinates of the given point, of the coordinates of the node closest to the given point and of the node data of the node closest to the given point, the calculator is designed to update data on the probability of belonging to a reference surface of a given point of the given point cloud as a function of the sign of the reference distance value, the calculator is designed to execute the maximization calculation step by calculating on the one hand a vector of information node data and information matrix data on the basis of the first spatial component and of the second spatial component, and the calculator is furthermore designed to execute the maximization calculation step on the basis of the temporal component.

The invention also relates to a computing method for driving assistance which comprises the following operations:

a) receive data point cloud data in which a point cloud associates, for a given instant, points each exhibiting coordinates in a plane associated with the point cloud and a value designating a height, b) for a given point cloud, calculate on the one hand data on the probability of belonging to a reference surface and which are associated with each point of the data point cloud, and on the other hand node data associating a value designating a height and two values indicating a slope in a plane associated with the plane of the given point cloud, by determining a Gaussian conditional random field by means of the data point cloud data corresponding to the given point cloud, which Gaussian conditional random field is represented by a mesh of nodes in said associated plane, which nodes are defined by the node data, c) return the data on the probability of belonging to a reference surface and/or some at least of the node data and values designating a height.

In other embodiments, the method will be able to exhibit one or more of the following additional characteristics:

the Gaussian conditional random field comprises a first spatial component calculated, for a given node, on the basis of a value derived from the difference between the height of the given node and a height calculated on the basis of the coordinates of the given node, of the slope data of the given node and of the coordinates of the points closest to the given node, and a second spatial component calculated, for a given node, on the basis of a value derived from the difference between the node data of the given node and of node data calculated on the basis of the coordinates of the given node, of the node data of the nodes closest to the given node and of the coordinates of the nodes closest to the given node, the Gaussian conditional random field furthermore comprises a temporal component calculated, for a given node and a given instant, on the basis of the node data of the given node and of the node data of the given node at an instant preceding the given instant, operation b) comprises the application of an expectation-maximization algorithm to calculate the data on the probability of belonging to a reference surface and the node data, operation b) comprises:
  b1) an initialization step,
  b2) an expectation calculation step, and
  b3) a maximization calculation step,
    steps b2) and b3) being repeated on the basis of the results of the previous steps until a convergence condition is fulfilled, operation b2) comprises the updating of the data on the probability of belonging to a reference surface of a given point of the given point cloud on the basis of a reference distance value derived from the difference between the value designating a height of the given point and of a height calculated on the basis of the coordinates of the given point, of the coordinates of the node closest to the given point and of the node data of the node closest to the given point, operation b2) comprises the updating of the data on the probability of belonging to a reference surface of a given point of the given point cloud as a function of the sign of the reference distance value, operation b3) comprises the calculation of a vector of information node data and of information matrix data on the basis of the first spatial component and of the second spatial component, and the calculation of operation b3) comprises the use of the temporal component.

Figure 2:
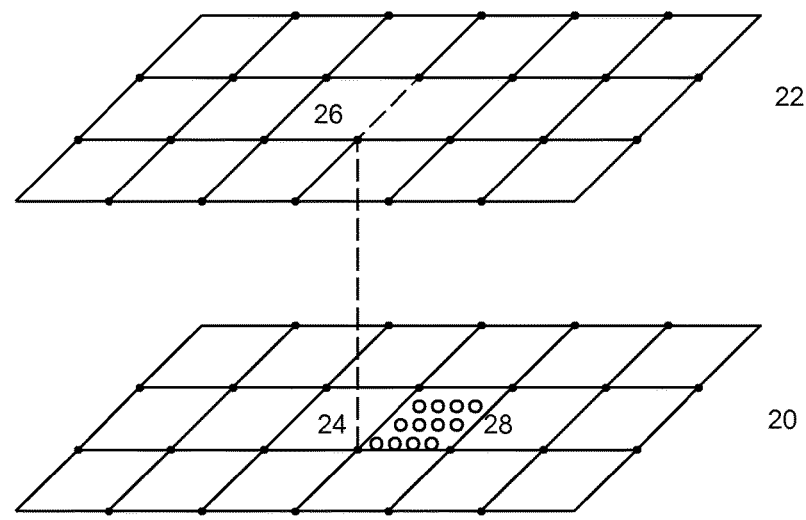
Figure 3:
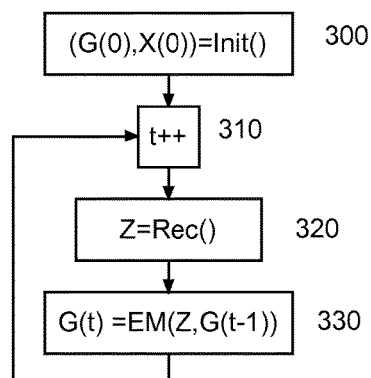
Figure 4:
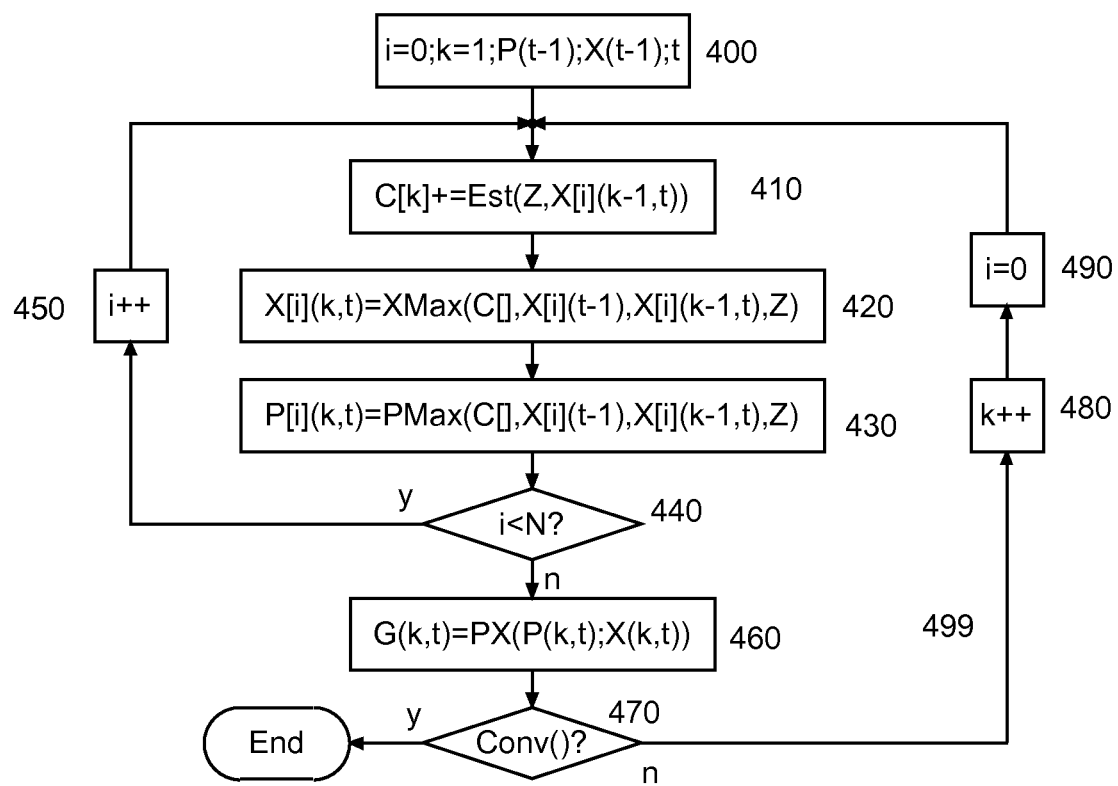

Other characteristics and advantages of the invention will become better apparent on reading the description which follows, derived from examples given by way of nonlimiting illustration and derived from the drawings in which:

FIG. 1 represents a schematic diagram of a device according to the invention and of the data that it processes, FIG. 2 represents a diagram as an example of the data model used by the device of FIG. 1, FIG. 3 represents an example of an operating loop of the device of FIG. 1, and FIG. 4 represents an exemplary implementation of a function of FIG. 3.

The drawings and the description hereinafter contain, in essence, elements of a definite character. They will therefore be able not only to serve to better elucidate the present invention, but also to contribute to its definition, if relevant.

The present description is of such a nature as to involve elements susceptible of protection by author's rights and/or copyright. The owner of the rights has no objection to the identical reproduction by anyone of the present patent document or of its description, such as it appears in the official records. For the remainder, he reserves his rights in full.

Furthermore, the detailed description is augmented by annex A, which gives the formulation of certain mathematical formulae implemented within the framework of the invention. This Annex is set apart with the aim of clarification, and to facilitate cross-referencing. It is an integral part of the description, and will therefore be able not only to serve to better elucidate the present invention, but also to contribute to its definition, if relevant.

Conditional random fields (hereinafter CRF) constitute an alternative to MRFs, but have no application in the sector of autonomous vehicles. They have known a few uses, for example by Lu et al. in "*A hybrid conditional random field for estimating the underlying ground surface from airborne lidar data*," IEEE Transactions on Geoscience and Remote Sensing, vol. 47, pp. 2913-2922, August 2009 or by Wang et al. in "*A dynamic conditional random field model for object segmentation in image sequences*" in 2005 IEEE Computer Society Conference on Computer Vision and Pattern Recognition (CVPR '05), vol. 1, pp. 264-270 vol. 1, June 2005.

Lu et al. relates to the characterization of a ground on the basis of images taken by an aerial LIDAR, by defining discrete random variables which represent whether or not a particular point belongs to the ground. This type of model is manifestly not compatible with autonomous vehicles, for which data acquisition is carried out much nearer to the ground, a consequence of which is that more complex discrimination needs to be carried out, as well as the presence of masked parts, be it by the vehicle itself or by any obstacle in the line of sight of the sensor. Moreover, Lu et al. uses supervised learning to classify the obstacles with the aid of extraction of characteristics, which is expensive and unsuitable for a navigation application with varied obstacles such as autonomous driving. Wang et al. is specific to the segmentation of image sequences, thereby rendering it likewise inapplicable to the autonomous vehicle sector.

The Applicant has discovered a means of adapting CRFs to the context of autonomous vehicles so as to discriminate in a point cloud those which relate to the ground, and those which belong to obstacles, and to do so in real-time. By real-time is meant a device which exhibits an economically reasonable calculation power and can be embedded on board a vehicle, and is capable of processing the data points more rapidly than the frequency of acquisition of the data points.

FIG. 1 represents a schematic diagram of a device 2 according to invention. The device 2 comprises a memory 4 and a calculator 6.

Within the framework of the invention, the memory 4 can be any type of data storage able to receive digital data: hard disk, flash memory hard disk (SSD), flash memory in any form, random-access memory, magnetic disk, locally distributed or cloud storage, etc. The data calculated by the device can be stored on any type of memory similar to the memory 8, or on the latter. These data can be erased after the device has performed its tasks or preserved.

The memory 4 receives data point cloud data 8 at a frequency corresponding to the acquisition frequency of the sensor of the autonomous vehicle in which the device 2 is installed. As a variant, the device 2 can be sited remotely and communicate with the autonomous vehicle by any appropriate means. The calculator 6 processes the point cloud data and returns discriminated data point cloud data 10, in which each data point is identified as belonging to the ground or to an obstacle. In an optional manner, a height relative to the ground can be appended to each data point of the discriminated data point cloud. The data point cloud data 8, like the discriminated data point cloud data 10, are ever coupled with a time marker, which makes it possible to determine the moment at which the data acquisition was carried out. As a variant, the calculator 6 can also return an elevation map of the ground in the form of a grid of points, with the slope associated with each point of the grid.

The calculator 6 is an element accessing the memory 4 directly or indirectly. It can be embodied in the form of an appropriate computer code executed on one or more processors. By processors must be understood any processor adapted to the calculations described below. Such a processor can be embodied in any known way, in the form of a microprocessor for personal computer, of a dedicated microchip of FPGA or SoC ("system on chip") type, of a calculation resource on a grid, of a microcontroller, or of any other form able to provide the calculation power necessary for the embodiment described below. One or more of these elements can also be embodied in the form of specialized electronic circuits such as an ASIC. A combination of processor and of electronic circuits can also be envisaged.

FIG. 2 represents a diagram as an example of the data model used by the device of FIG. 1. The Applicant has discovered that a spatio-temporal conditional random field (hereinafter STCRF) makes it possible to solve the problems related with the discrimination of data point clouds obtained at low altitude.

In the example described here, the ground is modeled in the form of a conditional random field represented by a mesh of nodes in a two-dimensional plane centered on the vehicle.

Each node has inherent coordinates in this plane and is associated with a hidden continuous random variable in the form of a triplet comprising a height, a slope in relation to a first axis of the two-dimensional plane, and a slope in relation to a second axis of the two-dimensional plane. Thus, for a node of index i and with coordinates nxi and nyi, the hidden continuous random variable is denoted $Gi=(hi,sxi,syi)^T$. The measurements contained in the data point cloud data 8 represent triplets of coordinates (xj, yj, zj) which are adapted to the frame of the two-dimensional plane.

The STCRF is based on three groups of interdependent neighborhoods:

The temporal neighborhood, which implies that one and the same node must have the same classification in two consecutive discriminated data point clouds, The spatial neighborhood, which implies that nodes that are very close spatially normally have similar heights, and The real neighborhood, which comprises observations (for example a prior classification of certain points and/or nodes) and hidden variables (like the height of the points and/or nodes and a probability of belonging to the ground).

Modeling via this STCRF makes it possible to determine, for each given point, the value of the probability that it belongs to the ground, as well as the height for the nodes of the mesh.

Thus, as may be seen in FIG. 2, for a particular data point cloud, the data of the STCRF are distributed over temporal planes 20 and 22. The temporal plane 20 represents the mesh for the particular data point cloud, and the temporal plane 22 represents the mesh for the data point cloud which is immediately prior to the particular data point cloud.

In the example described here the temporal neighborhood is therefore formed, for a node 24 of the temporal plane 20 by the node 26 which corresponds to it in the temporal plane 22. The way in which account is taken of the displacement of the vehicle to determine the node 26 will be explained below.

The node 24 is surrounded by a set of data points 28. As described above, each data point 28 has coordinates (xj, yj, zj) which represent a measurement here obtained by LIDAR). A binary random variable cj is associated with each measurement. As will be seen below, the device 2 implements a calculation loop which makes it possible to evaluate the value of the variable cj. For the purposes of these calculations, each data point 28 is associated with the node Gi to which it is closest according to a metric measurement.

The three neighborhoods are united in a Gibbs distribution in the form of three equations [10], [20] and [30] of Annex A. Equation [10] relates to the real neighborhood, equation [20] relates to the spatial neighborhood and equation [30] relates to the temporal neighborhood.

In equation [10], W1 is a normalization factor, $\alpha$ is a weighting factor, Mi designates the set of the data points which are associated with a given node Gi, and Hij is a matrix defined by formula [15] of Annex A. Multiplying the matrix Hij by Gi amounts to estimating the height of the node Gi at the data point of index j, taking account of the slope sxi and syi of Gi and of the distances between the node Gi and the data point of index j. Thus equation [10] determines a value derived from the difference between the height of the measurement of each of the data points and the height that the closest node would have at these points, the variable cj influencing whether each data point is or is not associated with the ground. In the example described here, the selection of the data points of the real neighborhood is carried out by shifting the mesh grid and by centering it on the nodes Gi. Thus, each mesh square contains the data points closest to the node Gi at the center of the mesh square considered.

In equation [20], W2 is a normalization factor, $\beta$ is a weighting factor, Vi designates the set of the neighbor nodes of a given node Gi, and Fij is a matrix defined by formula [25] of Annex A. Applying the matrix Fij to Gj amounts to estimating the height of the node Gj at the location of the node of index i, taking account of the slope sxj and syj of Gj, and of the distances between the node Gj and the node Gi. Thus equation [20] determines a value derived from the difference between the height of each of the nodes and the height that the neighbor nodes would have at these nodes. In the example described here, the spatial neighbors are the 8 nodes closest to each given node. This gives a good compromise between number of iterations necessary to converge and amount of calculation necessary for each step. As a variant, the spatial neighborhood could be reduced to 4, or indeed 2 nodes, or greater than 8. Still as a variant, equation [20] could comprise a weighting factor for each neighbor node Gj, for example of the Gaussian kernel type.

In equation [30], W3 is a normalization factor, $\gamma$ is a weighting factor, Qi designates a transition matrix of the node Gi for the data point cloud immediately prior to the current data point cloud in the state of the node Gi for the current data point cloud. In the example described here, the matrix Qi is chosen equal to the identity matrix, but it could be different so as to introduce noise which would correspond to a confidence interval for the measurements which made it possible to interpolate the node $Gi^{t-1}$ or so as to take account of a change in the height of the ground over time (due for example to waves in a maritime application). To take account of the fact that the vehicle is moving, the determination of the node $Gi^{t-1}$ is done by transforming the mesh of the data point cloud immediately prior to the current data point cloud as a function of the data in respect of the vehicle's displacement and change of orientation. These data can be derived from an inertial measurement unit, and/or GPS data, and/or data of an odometer or other schemes using other sensors (visual odometry, SLAM laser, etc.). The value of $Gi^{t-1}$ is then calculated by interpolation of the transformed mesh at the location of the node Gi. For the nodes for which no information was available, that is to say corresponding to a zone not visited by the vehicle, $Gi^{t-1}$ is marked as undefined, so that the pair Gi-$Gi^{t-1}$ is not taken into account, while the zones which disappear following the transformation can be discarded or stored in a long-term mapping. In other variants, the temporal neighborhood could include a node of an even older cloud. Nonetheless, the use of a single temporal neighbor suffices to force coherence for the nodes which are situated in a zone which has become blind because of the occurrence of an obstacle such as another vehicle, or through the displacement of the autonomous vehicle itself. As a variant, the temporal neighborhood and equation [30] could be omitted, on condition that loss of temporal cohesion is accepted and that dynamic shadow zones are experienced as a function of the obstacles encountered.

The invention relies on the transformation of an a priori mesh into a mesh which maximizes the a posteriori probability according to formula [40] of Annex A. Accordingly, each node is assigned a Gaussian model for the state of the ground, each node Gi being represented by a mean vector Gmi and a covariance matrix Mi. To simplify the calculations, these relations are rewritten with a matrix Pi which is the inverse of the covariance matrix Mi and a vector Xi which is equal to the product of the matrix Pi and of the mean vector Gmi. Once the matrix Pi and the vector Xi have been determined, Gmi can be defined according to formula [50] of Annex A.

In order to approximate the full distribution over G, an iterative expectation-maximization algorithm is executed to determine the matrix Pi and the vector Xi, in which the expectation step estimates the probability distribution over the classification distribution of the data points Ci, and a maximization step uses this distribution to estimate the distribution of state of the ground. These two steps are repeated in a loop until a convergence condition is attained.

FIG. 3 represents an example of a function executed by the calculator 6 to implement these calculations.

In an operation 300, the calculator 6 executes a function Init( ). In the example described, the starting mesh is flat. This function therefore initializes the vectors Gmi of G(0) with a zero height and slopes. This therefore also initializes X(0) to 0. On starting from another, non-flat, a priori mesh, the function Init( ) would initialize the vectors Gmi as a function of this other mesh. This initialization will also be performed whenever a new node (that is to say a node at a location which has not been processed in any of the previous loops) is defined for a data point cloud, when the vehicle is moving. The covariance matrix Mi is initialized with significant diagonal coefficients, so that these initialization values do not influence the final result of the algorithm but make it possible to accelerate its convergence.

A loop is then executed until the autonomous vehicle stops running, with in an operation 310 the incrementation of an index t, in an operation 320 the execution of a function Rec( ) which receives a current data point cloud and stores the corresponding measurements in a vector Z, and in an operation 330 the execution of a function EM( ) which determines the vector G(t) on receiving the vector Z and the vector G(t-1) of the previous loop as arguments.

FIG. 4 represents an exemplary implementation of the function EM( ).

In an operation 400, the function EM( ) initializes by defining an index i at 0 and an index k at 1, by determining P(t-1) and X(t-1) on the basis of G(t-1) and by defining the current loop index t.

Two loops are then launched. The first loop traverses, for a given index k, all the nodes of index i and updates the probability C[ ], the vector X[i] and the matrix P[i]. The vector C[ ] therefore contains, for a given index k, the probabilities of all the nodes of index i of the current loop of index t. The second loop consists in repeating the first loop with the updated nodes, therefore by varying the index k, until a convergence condition is fulfilled.

10

Although the presentation of FIG. 4 is presented in iterative form, through the very nature of the calculations that they contain, the operations of the first loop could be carried out in parallel. Stated otherwise, for a fixed index k, the first loop associated with each index i could be parallelized, and be for example executed all or in part in parallel on a graphics processor, whose qualities are known for these applications.

Thus, the probability C is updated in an operation 410 by a function Est( ) which receives the vector Z and the vector X[i] as argument. The function Est( ) selects the set of the data points of the vector Z which are associated with the node of index i, and evaluates for each of them a probability cj that it stores in the vector C[k]. The probability cj is calculated according to formula [60] of Annex A. For the first iteration of the function Est( ) when X[i](k-1,t) does not exist, it is X[i](t-1) which is used. In the case where the ground would be considered to be shifting temporally, this variation could be taken into account and applied to X[i](t-1).

This formula amounts to determining a value derived from the distance between the measurement zj of a data point and the estimated height of the node Gmi displaced to the location of the data point. The exponential with the factors $\sigma 1$ and $\sigma 2$ make it possible to converge rapidly toward 1 when the difference is close to zero. In the example described here, $\sigma 1$ is fixed at 0.05 m and $\sigma 2$ is fixed at 0.5 m. These values make it possible to give more importance to the data points whose height is small and makes it possible to converge for the low part of the obstacles (which are therefore not ground). As a variant, the formula when the difference of formula [60] of Annex A is negative could fix a value of cj equal to 1.

Once the expectation step has terminated with the operation 410, the maximization step is executed with operations 420 and 430.

In the operation 420, a function XMax( ) receives the vector C[ ], the vector X[i](t-1) and the vector X[i](k-1,t) of the previous iteration as well as the vector Z as arguments and updates the vector X[i] (k,t) of the current iteration by applying formula [70] of Annex A.

Formula [70] of Annex A amounts to undertaking a maximization of formulae [10], [20] and [30] for the vector X[i], their exponential formulation allowing a linear formula in the presence of the Gaussian model.

In a similar manner, in the operation 430, a function PMax( ) receives the vector C[ ], the matrix P[i](t-1) and the matrix P[i](k-1,t) of the previous iteration as well as the vector Z as arguments and updates the vector P[i](k,t) of the current iteration by applying formula [80] of Annex A.

Just as for formula [70] of Annex A, formula [80] of Annex A amounts to undertaking a maximization of formulae [10], [20] and [30] for the matrix P[i], their exponential formulation allowing a linear formula in the presence of the Gaussian model.

In the example described here, the weighting factor $\alpha$ has been fixed at 1, the weighting factor $\beta$ has been fixed at 0.5, and the weighting factor $\gamma$ has been fixed at 0.2. These weighting factors could be fixed otherwise and correspond to the importance that it is desired to give to the respective neighborhoods in the determination of the solution.

The index i is then tested to determine whether all the nodes have been updated for the loop of current index k in an operation 440. If this is not the case, then the index i is incremented in an operation 450 and the operations 410 to 440 are repeated.

When all the nodes have been updated, the estimation for the current iteration of each vector Gmi, which are stored in a table G(k,t), is calculated in an operation 460 which receives the current vector X(k,t) and the current matrix P(k,t) as arguments. This is carried out by applying formula [90] of Annex A, which corresponds to the transposition to the current iteration of formula [50] of Annex A.

Finally, a function Conv( ) is executed in an operation 470. The function Conv( ) determines whether the function EM( ) has converged, or whether it is necessary to undertake another iteration. This determination can be based on the number of iterations, the Applicant having noted that, for the parameters described hereinabove, 10 iterations always suffice to converge, or on an inherent convergence condition, for example comparison between G(k,t) and G(k-1,t).

When a new iteration is necessary, the index k is incremented in an operation 480 and the index i is reset to zero in an operation 490, and the loop resumes with the operation 410. Otherwise, the function EM( ) terminates, returning the table G(k,t) in an operation 499.

The example described here has been validated with data point clouds obtained by LIDAR, by means of a Velodyne HDL64 LIDAR mounted on a Renault Zoe as well as with 3 Ibeo Lux LIDARs. As a variant, other sources of point clouds could be used such as stereo cameras or depth camera of Kinect type or others. Furthermore, to reduce the calculations, the real neighborhood could be reduced by taking account of the distance to the vehicle. Indeed, by nature, the LIDAR returns an enormous number of points near the vehicle, and then fewer and fewer as the firing angle increases. As a variant, the number of neighbors could be preserved, but used to accelerate the convergence by forcing the coherence of the nodes of the mesh with them. To accelerate the convergence, the points which are very close to the vehicle could also have a height forced to that of the vehicle. Finally, the grid described here is square-patterned, but it could be adapted to the technology for capturing the data point clouds, for example be a polar grid with circular patterns.

Annex A $$\Psi = \frac{1}{W1}\exp\left(-\sum_k \alpha \sum_{j \in Mi} cj\|zj - HijGj\|^2\right)$$

$$Hij = [\,1\ \ xi - nxi\ \ yi - nyi\,]$$

$$\Phi = \frac{1}{W2}\exp\left(-\sum_k \beta \sum_{j \in Vi} \|Gi - FijGi\|^2\right)$$

$$Hij = \begin{bmatrix} 1 & nxj - nxi & nyj - nyi \\ 0 & 1 & 0 \\ 0 & 0 & 1 \end{bmatrix}$$

$$\xi = \frac{1}{W3}\exp\left(-\sum_k \gamma \|Gi - QiGi^{t-1}\|^2\right)$$

$$\{gmi\} = \operatorname{argmax}_{gi}(P(G = \{gi\} \mid C, Z, G^{t-1}))$$

$$Gmi = Pi^{-1} Xi$$

$$cj = \begin{cases} \exp\left(-\dfrac{(zi - HijX[i](k-1, t))^2}{2\sigma 1^2}\right) & \text{if } (zi - HijX[i](k-1, t)) \geq 0 \\ \exp\left(-\dfrac{(zi - HijX[i](k-1, t))^2}{2\sigma 2^2}\right) & \text{otherwise} \end{cases}$$

$$X[i](k, t) = \alpha \sum_{j \in Mi} cjzjHij^T + \beta \sum_{j \in Vi} Fij^T X[j](k, t) + \gamma Qi^T P[i](t-1)$$

$$P[i](k, t) = \alpha \sum_{j \in Mi} cjHij^T Hij + \beta \sum_{j \in Vi} Fij^T P[j](k, t)Fij + \gamma Qi^T P[i](t-1)Qi$$

$$Gm[i](k, t) = P[i](k, t)^{-1} X[i](k, t)$$

The invention claimed is:

1. A computerized device for driving assistance, comprising a memory designed to receive data points cloud data in which a point cloud associates, for a given instant (t), points each exhibiting coordinates (xi, yi) in a plane associated with the point cloud and a value designating a height (zi), each data point belonging to a reference surface (cj) or an obstacle, characterized in that it furthermore comprises a calculator designed to access the memory and, for a given point cloud, to calculate on the one hand data on the probability of belonging to the reference surface (cj) and which are associated with each point of the data point cloud, and on the other hand nodes data (hi, sxi, syi) associating a value designating a height (hi) and two values indicating a slope (sxi, syi) in a plane associated with the plane of the given point cloud, by determining a Gaussian conditional random field (CRF) by means of the data points cloud data corresponding to the given point cloud, which Gaussian conditional random field (CRF) is represented by a mesh of nodes in said associated plane, which nodes are defined by the nodes data (hi, sxi, syi), and to return the data on the probability of belonging to the reference surface (cj) and/or some at least of the nodes data (hi, sxi, syi) and of the values designating a height (zi), in which the Gaussian conditional random field (CRF) comprises a first spatial component calculated, for a given node (Gi), on the basis of a value derived from the difference between the height (hi) of the given node (Gi) and a height (HijGi) calculated on the basis of the coordinates of the given node (nxi, nyi), of the slope data (sxi, syi) of the given node (Gi) and of the coordinates (xj, vj) of the closest points (Mi) to the given node (Gi), and a second spatial component calculated, for a given node (Gi), on the basis of a value derived from the difference between the node data of the given node (Gi) and of node data (FijGj) calculated on the basis of the coordinates of the given node (nxi, nyi), of the node data (Gj) of the closest nodes (Vi) to the given node (Gi) and of the coordinates (xj, yj) of the closest nodes (Gj) to the given node (Gi).

2. The device as claimed in claim 1, in which the Gaussian conditional random field (CRF) comprises a temporal component calculated, for a given node (Gi) and a given instant (t), on the basis of the node data of the given node and of the node data of the given node at an instant preceding the given instant (Gi(t-1)).

3. The device as claimed in claim 1, in which the calculator is designed to apply an expectation-maximization algorithm to calculate the data on the probability of belonging to the reference surface (cj) and the nodes data (hi, sxi, syi).

4. The device as claimed in claim 3, in which the calculator is designed, after an initialization step, to apply the expectation-maximization algorithm by alternating an expectation calculation step and a maximization calculation step until a convergence condition is fulfilled.

5. The device as claimed in claim 4, in which the calculator is designed to execute the expectation calculation step by updating the data on the probability of belonging to the reference surface (cj) of a given point of the given point cloud on the basis of a reference distance value (dzj) derived from the difference between the value designating a height (zj) of the given point and of a height (HijXi) calculated on the basis of the coordinates of the given point (xj, yj), of the coordinates (nxi, nyi) of the node closest to the given point and of the node data (hi, nxi, nyi, sxi, syi) of the node closest to the given point.

6. The device as claimed in claim 5, in which the calculator is designed to update data on the probability of belonging to the reference surface (cj) of a given point of the given point cloud as a function of the sign of the reference distance value (dzj).

7. The device as claimed in claim 6, in which the calculator is designed to execute the maximization calculation step by calculating on the one hand a vector of information node data (Xi(k,t)) and information matrix data (Pi(k,t)) on the basis of the first spatial component and of the second spatial component.

8. The device as claimed in claim 7, in which the calculator is furthermore designed to execute the maximization calculation step on the basis of the temporal component.

9. A computing method for driving assistance, characterized in that it comprises the following operations:
  a) receive data points cloud data in which a point cloud associates, for a given instant (t), points each exhibiting coordinates (xi, yi) in a plane associated with the point cloud and a value designating a height (zi), each data point belonging to a reference surface (ci) or an obstacle,
  b) for a given point cloud, calculate on the one hand data on the probability of belonging to the reference surface (cj) and which are associated with each point of the data point cloud, and on the other hand nodes data (hi, sxi, syi) associating a value designating a height (hi) and two values indicating a slope (sxi, syi) in a plane associated with the plane of the given point cloud, by determining a Gaussian conditional random field (CRF) by means of the data points cloud data corresponding to the given point cloud, which Gaussian conditional random field (CRF) is represented by a mesh of nodes in said associated plane, which nodes are defined by the nodes data (hi, sxi, syi),
  c) return the data on the probability of belonging to a reference surface (cj) and/or some at least of the nodes data (hi, sxi, syi) and of the values designating a height (zi),
  in which the Gaussian conditional random field (CRF) comprises a first spatial component calculated, for a given node (Gi), on the basis of a value derived from the difference between the height (hi) of the given node (Gi) and a height (HijGi) calculated on the basis of the coordinates of the given node (nxi, nyi), of the slope data (sxi, syi) of the given node (Gi) and of the coordinates (xj, yj) of the closest points (Mi) to the given node (Gi), and a second spatial component calculated, for a given node (Gi), on the basis of a value derived from the difference between the node data of the given node (Gi) and of node data (FijGj) calculated on the basis of the coordinates of the given node (nxi, nyi), of the node data (Gj) of the closest nodes (Vi) to the given node (Gi) and of the coordinates (xj, yj) of the closest nodes (Gj) to the given node (Gi).

10. The method as claimed in claim 9, in which the Gaussian conditional random field (CRF) furthermore comprises a temporal component calculated, for a given node (Gi) and a given instant (t), on the basis of the node data of the given node (Gi) and of the node data of the given node (Gi) at an instant preceding the given instant (Gi(t-1)).

11. The method as claimed in claim 9, further comprises application of an expectation-maximization algorithm to calculate the data on the probability of belonging to the reference surface (cj) and the nodes data (hi, sxi, syi).

12. The method as claimed in claim 11, in which the application of the expectation-maximization algorithm comprises:
  an initialization step,
  an expectation calculation step, and
  a maximization calculation step,
  the expectation calculation step and the maximization calculation step being repeated on the basis of the results of the previous steps until a convergence condition is fulfilled.

13. The method as claimed in claim 12, in which the expectation calculation step comprises the updating of the data on the probability of belonging to the reference surface (cj) of a given point of the given point cloud on the basis of a reference distance value (dzj) derived from the difference between the value designating a height (zj) of the given point and of a height (HijXi) calculated on the basis of the coordinates of the given point (xj, yj), of the coordinates (nxi, nyi) of the node closest to the given point and of the node data (hi, nxi, nyi, sxi, syi) of the node closest to the given point.

* * * * *